Figure 3:
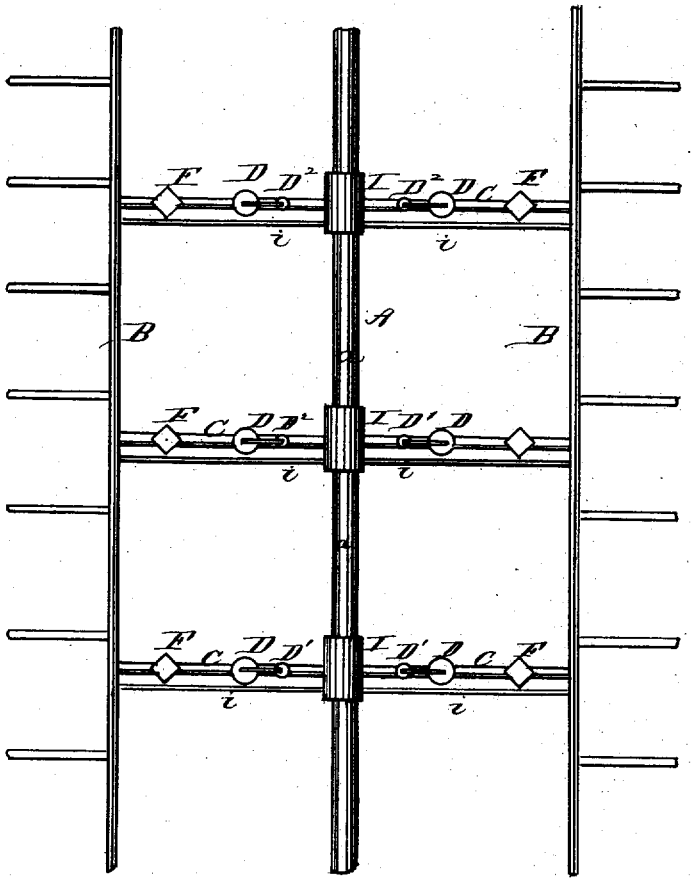

3 Sheets—Sheet 1.
W. A. HOEVELER & T. J. McTIGHE.
SYSTEM FOR DISTRIBUTING GAS UNDER PRESSURE.
No. 11,284. Reissued Nov. 15, 1892.
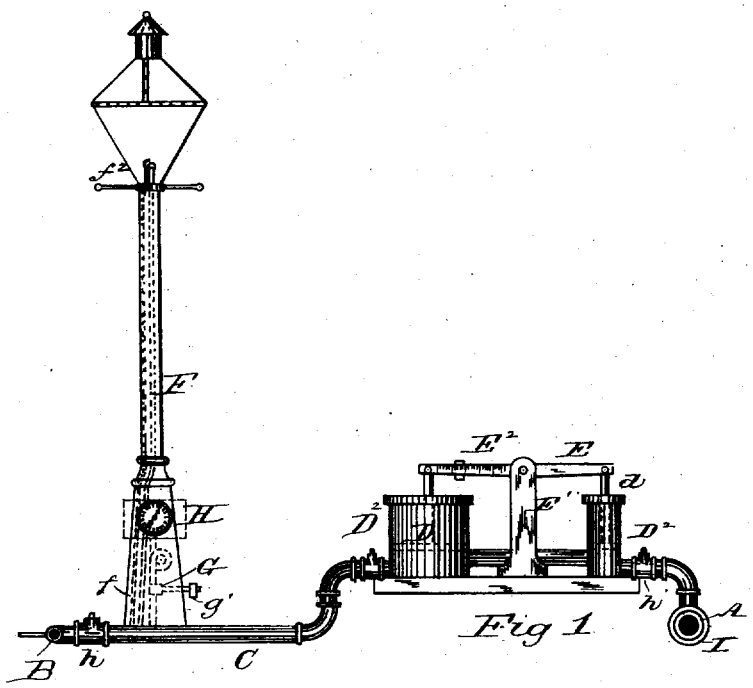
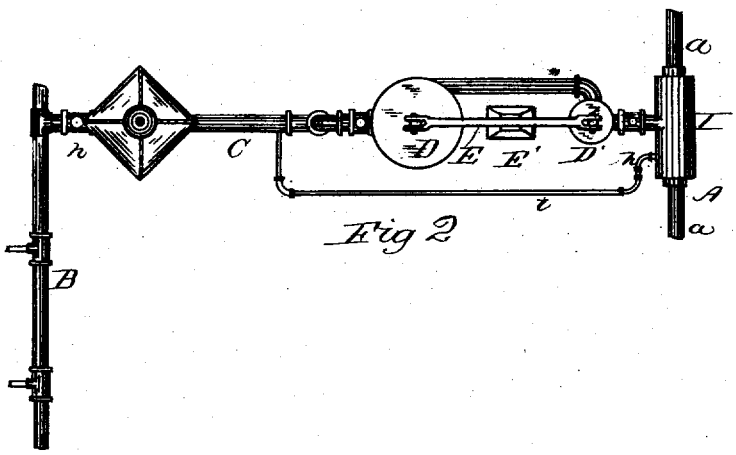
Witnesses
Andy le Rawlings
W. Ofterarus
Inventors
William A. Hoevelen
Thos J. McTighe
by Connolly Bros
Attys.
THE NORRIS PETERS CO., PHOTO-LITHO., WASHINGTON, D. C.

3 Sheets—Sheet 2.

W. A. HOEVELER & T. J. McTIGHE.

SYSTEM FOR DISTRIBUTING GAS UNDER PRESSURE.

No. 11,284. Reissued Nov. 15, 1892.

Witnesses
Andy C. Rawlings
W. Stearns

Inventors
William A. Hoeveler
Thos. J. McTighe.
by Connolly Bros
Attys.

THE NORRIS PETERS CO., PHOTO-LITHO., WASHINGTON, D. C.

W. A. HOEVELER & T. J. McTIGHE.

SYSTEM FOR DISTRIBUTING GAS UNDER PRESSURE.

No. 11,284. Reissued Nov. 15, 1892.

Witnesses
Andy de Rawlings
W. Stearns

Inventors
William A. Hoeveler
Thos J. McTighe
by Connolly Bro
Attys

THE NORRIS PETERS CO., PHOTO-LITHO., WASHINGTON, D. C.

BEST AVAILABLE COPY

UNITED STATES PATENT OFFICE.

WILLIAM A. HOEVELER AND THOMAS J. McTIGHE, OF PITTSBURG, PENNSYLVANIA; SAID McTIGHE ASSIGNOR TO SAID HOEVELER.

SYSTEM FOR DISTRIBUTING GAS UNDER PRESSURE.

SPECIFICATION forming part of Reissued Letters Patent No. 11,284, dated November 15, 1892.

Original No. 312,470, dated February 17, 1885. Application for reissue filed November 7, 1885. Serial No. 182,152.

DIVISION B.

*To all whom it may concern:*

Be it known that we, WILLIAM A. HOEVELER and THOMAS J. McTIGHE, citizens of the United States, residing at Pittsburg, in the county of Allegheny and State of Pennsylvania, have invented certain new and useful Improvements in Systems for Distributing Gas Under Pressure; and we do hereby declare the following to be a full, clear, and exact description of the invention, reference being had to the accompanying drawings, forming part of this specification.

Where gas is extensively used as a heating and illuminating agent there has always been a certain amount of leakage at the joints of the conveying pipes or conduits. Where the gas is under considerable pressure, the leakage is very considerable, and especially where "natural gas" is being conveyed there is great danger of the gas accidentally becoming ignited and exploding and inflicting injury upon buildings in the vicinity of the pipe, as such gas is inodorous and imperceptible, and hence it is exceedingly difficult to detect any leakage. Natural gas usually issues from the earth at a very high and accumulative pressure, and in some instances it is desirable to deliver it at high pressure at the point where it is to be used. In other instances it is essential that the gas should be delivered at very much lower pressure.

Our invention relates to systems for the distributition of gas, and has for its object the provision of means whereby gas under pressure may be delivered to points of consumption from a common source at either high or low pressure.

Our invention has for its still further object the provision of means whereby gas may be delivered from a common source to points of consumption at both high and low pressure and the latter determined and regulated at will and automatically preserved at the determined degree.

Our invention has for its still further object the provision of means in a system of distributing gas employing separate conduits for conveying gas under high and low pressure for indicating by visual signals any increase of pressure in the low-pressure cond beyond the determined point.

Having in view the above-mentioned objects, our invention consists in the peculiar construction, combination, and arrangement of parts hereinafter described and specifically claimed.

In carrying out our invention we propose to lay two separate pipes or conduits, one being used exclusively for the conveyance of gas under high and the other under low pressure. These separate conduits we connect at intervals by means of suitable pipes, interposing in the connecting-pipes automatic pressure-regulating valves, which will cut off the supply of gas from the high-pressure conduit if the pressure in the low-pressure conduit exceeds a certain predetermined degree. We also inclose the joints of the high-pressure conduits in casings or boxes, which are connected to the pipes leading to the low-pressure conduits or directly to the latter, whereby any leakage of the joint is utilized as a source of supply for the low-pressure conduit and provide a visual signal, as a gage or gas burner, or both, which will be supplied with gas and brought into play when the pressure in the low-pressure conduit exceeds the determined degree.

Referring to the accompanying drawings, Figure 1 is an elevation of the automatic pressure-regulator and the visual signal, the two conduits being in section; Fig. 2, a plan view of the same, and Figs. 3 and 4 details.

A designates the high-pressure conduit, which is constructed of any suitable material, such as an ordinary gas-pipe in sections *a a*.

B designates the low-pressure conduit, similarly constructed and connected to the high-pressure conduit or pipe A by a pipe C, communicating with a pressure-regulator, which comprises two cylinders D D′ of different sizes, connected by a pipe *d* and provided with suitable pistons $D^2$ $D^2$, whose rods $d^2$ $d^2$ are attached to a lever E, pivoted at *e* to a standard E′. The lever E is provided with a scale and a sliding weight $E^2$, through the medium of which the variation of pressure required to operate the device may be determined or fixed.

The pressure-regulating device described is well known, and we make no claim to the construction of the same, as any cut-off device adapted to be automatically operated by a variation of pressure on one or either side may be employed.

F designates a lamp-post connected to pipe C by a small pipe $f$, to which is attached a weighted valve G, the object of such valve being to allow the gas to flow to the burner of the lamp-post when the pressure in the low-pressure conduit passes a certain point, a small pipe $f^2$ serving to maintain a constant flame adjacent to the burner, so that the gas from the latter will be ignited immediately upon the opening of the valve G by the increase of pressure, as above mentioned. By means of a sliding weight $g'$ on the arm $g$ of valve G the point of pressure at which the gas is allowed to flow to the burner may be determined and regulated.

H designates a pressure-gage, which is also attached to pipe $f$ and brought into operation by the opening of the valve G in the same manner as the gas-burner.

The object of the visual signals described is to give notification of an abnormal amount of pressure in the low-pressure conduit in the event of the pressure-regulating valve failing to operate, and for the purpose of facilitating the cleaning or repair of the latter suitable cocks $h$ $h$ are placed in pipe C, by means of which the gas may be shut off when desired.

At each joint of the high-pressure conduit A we place boxes I, which entirely surround said joints, and are packed carefully so as to guard as much as possible against leaking, and we connect each of the boxes by a pipe $i$ with the low-pressure conduit B, so as to lead off any gas which may escape through the joints of the high-pressure pipe.

While we have described but one high-pressure and one low-pressure conduit, it is to be noted that two or more of the latter may be connected to one of the former, or vice versa.

As to the number of pressure-regulating valves, visual signals, &c., they may be increased to any desired extent without departing from the spirit of our invention.

Operation: The gas, being let into the high-pressure conduit A from the source of supply, passes through the connecting-pipe C to the low-pressure conduit B. When the pressure of the latter reaches the desired point, (the regulating-valve having been adjusted to operate at that point,) the flow of gas from the conduit A is cut off wholly or in part and a constant degree of pressure maintained in the conduit B. Should the pressure-regulating valve G for any reason fail to operate, the increasing pressure in conduit B will cause the valve G to open, the gas will become ignited in the burner above, and the gage H will indicate the amount of pressure in the pipe.

Figure 4:
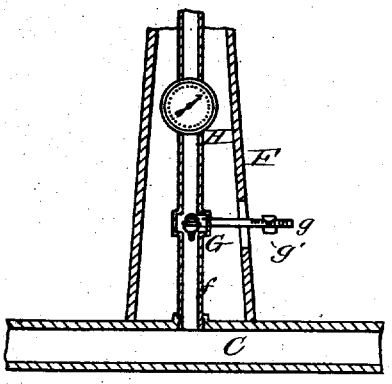

In practice the high-pressure conduit is led along the center of the street or highway, and the two low-pressure pipes related thereto, as described, are arranged along close to the curb or sidewalk, so that the service-pipes to the consumers will be short and avoid the necessity of digging up the street to effect a connection, and we have shown this arrangement in Fig. 3 of the drawings.

In an application filed September 28, 1885, Serial No. 178,318, for the reissue of Letters Patent No. 312,470, granted to us the 17th day of February, 1885, of which application the present application is a division, we have shown and described all the features embraced in the foregoing specification; but in said application we have limited our claims to the following features of invention, to wit: first, the combination of a gas pipe or main made with jointed sections, the chamber inclosing each joint, and the vent-pipe; second, the combination of a gas pipe or main made with jointed sections, the chamber inclosing each joint, the vent-pipe, and the low-pressure or supplemental pipe. We therefore do not in the present application make any claim to such features; but What we do claim, and desire to secure by Letters Patent, is—

1. In a system for distributing gas under pressure, the combination, with two separate conduits, one adapted to convey gas under a higher pressure than the other, of a pressure-regulating device connected to both, and a visual signal consisting of a burner and a pressure-indicating gage attached to the low-pressure conduit and adapted to indicate an abnormal pressure and the amount of the same, substantially as described.

2. In a system for distributing gas under pressure, the combination, with a high-pressure conduit A and a low-pressure conduit B, connected together by a pipe C, furnished with a pressure-regulator, of a casing I, surrounding the high-pressure conduit at its point of connection with the regulator-pipe C, and a pipe $i$, connecting the casing I with the low-pressure conduit, substantially as described.

3. In a system of distributing gas under pressure, the combination, with two conduits, one adapted to convey gas under higher pressure than the other and a regulating-valve adapted to regulate the relative degrees of pressure in the two, of a gage connected to the low-pressure conduit and provided with a valve adapted to be opened by a pressure greater than that required to operate said regulating-valve, substantially as and for the purpose described.

4. In a system for the distribution of gas, the combination of two separate and substantially-parallel conduits or pipes located apart from one another, constituting a high and low pressure main and communicating by connecting-pipes, said low-pressure conduit or pipe receiving its supply solely from said high-pressure conduit or pipe and through said connecting-pipes, substantially as described.

5. In a system for the distribution of gas, comprising high and low pressure mains connected together, the combination, with the low-pressure main, of a lamp-post, a gage, and an automatic blow-off valve located in a pipe leading from the low-pressure main or conduit, said valve and gage being secured to or within said lamp-post, substantially as described and shown.

In testimony that we claim the foregoing we have hereunto set our hands this 5th day of November, A. D. 1885.

WILLIAM A. HOEVELER.
THOMAS J. McTIGHE.

Witnesses:
JOHN F. ATCHESON,
A. A. CONNOLLY.